US011107186B2

(12) United States Patent
Brady et al.

(10) Patent No.: US 11,107,186 B2
(45) Date of Patent: *Aug. 31, 2021

(54) MEDIA CONTENT MANAGEMENT FOR A FIXED ORIENTATION DISPLAY

(71) Applicant: GOOGLE LLC, Mountain View, CA (US)

(72) Inventors: Patrick Brady, San Francisco, CA (US); Dianne Hackborn, Mountain View, CA (US); Jason Bayer, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,450

(22) Filed: Sep. 4, 2020

(65) Prior Publication Data

US 2020/0402201 A1 Dec. 24, 2020

Related U.S. Application Data

(63) Continuation of application No. 16/780,717, filed on Feb. 3, 2020, now Pat. No. 10,769,756, which is a (Continued)

(51) Int. Cl.
*G06T 3/40* (2006.01)
*G09G 5/00* (2006.01)
(Continued)

(52) U.S. Cl.
CPC ............. *G06T 3/40* (2013.01); *G06F 3/0481* (2013.01); *G06F 3/0487* (2013.01); *G06T 3/60* (2013.01);
(Continued)

(58) Field of Classification Search
None
See application file for complete search history.

(56) References Cited

U.S. PATENT DOCUMENTS

2006/0188173 A1 8/2006 Zhang et al.
2008/0007648 A1* 1/2008 Chen .................... G06T 3/0006
348/441
(Continued)

FOREIGN PATENT DOCUMENTS

CN 101639753 2/2010
CN 102662616 9/2012
(Continued)

OTHER PUBLICATIONS

Decision to Refuse a European Patent Application dated Feb. 6, 2019 in EP Patent Application No. 13773993.4.
(Continued)

*Primary Examiner* — Yi Wang
(74) *Attorney, Agent, or Firm* — Byrne Poh LLP

(57) ABSTRACT

A method is implemented at an electronic device for displaying output from an application. The electronic device includes a display module and an application. The application sends to the display module a request to display output on the fixed orientation display. The display module determines whether the application is able to scale the output from the application to fit the fixed orientation display. In accordance with a determination that the application is able to scale the output, the electronic device causes the application to receive information concerning the fixed orientation display from the display module and scale the output for display on the fixed orientation display according to the information. In accordance with a determination that the application is not able to scale the output, the display module scales the output received from the application, thereby enabling the output of the application to be displayed on the fixed orientation display.

20 Claims, 5 Drawing Sheets

Related U.S. Application Data continuation of application No. 16/124,075, filed on Sep. 6, 2018, now Pat. No. 10,552,941, which is a continuation of application No. 15/671,022, filed on Aug. 7, 2017, now Pat. No. 10,074,157, which is a continuation of application No. 15/207,263, filed on Jul. 11, 2016, now Pat. No. 9,767,532, which is a continuation of application No. 13/624,570, filed on Sep. 21, 2012, now Pat. No. 9,390,473.

(51) Int. Cl.
*G06T 3/60* (2006.01)
*G06F 3/0481* (2013.01)
*G06F 3/0487* (2013.01)

(52) U.S. Cl.
CPC ....... *G09G 5/005* (2013.01); *G09G 2340/045* (2013.01); *G09G 2340/0407* (2013.01); *G09G 2340/0442* (2013.01)

(56) References Cited

U.S. PATENT DOCUMENTS

| | | |
|---|---|---|
| 2010/0149216 A1 | 6/2010 | Dutta et al. |
| 2010/0225669 A1* | 9/2010 | Park .................... G09G 5/005 345/661 |
| 2011/0157475 A1 | 6/2011 | Wright et al. |
| 2012/0038678 A1 | 2/2012 | Hwang et al. |
| 2012/0089906 A1 | 4/2012 | Reeves et al. |
| 2012/0176396 A1 | 7/2012 | Harper et al. |
| 2013/0007602 A1* | 1/2013 | Dougherty ............ G06F 40/114 715/251 |
| 2013/0007603 A1 | 1/2013 | Dougherty et al. |
| 2013/0019183 A1 | 1/2013 | Reeves et al. |
| 2013/0113783 A1* | 5/2013 | Pourbigharaz ... H04N 21/42202 345/419 |

FOREIGN PATENT DOCUMENTS

| | | |
|---|---|---|
| CN | 102681810 | 9/2012 |
| EP | 2228788 A1 | 9/2010 |
| KR | 20030093881 | 12/2003 |
| KR | 20100035924 | 4/2010 |

OTHER PUBLICATIONS

Examination Report dated Oct. 18, 2017 in EP Patent Application No. 13773993.4.
Examination Report dated Oct. 28, 2016 in EP Patent Application No. 13773993.4.
Notice of Allowance dated Mar. 10, 2016 in U.S. Appl. No. 13/624,750.
Notice of Allowance dated May 7, 2018 in U.S. Appl. No. 15/671,022.
Notice of Allowance dated May 9, 2017 in U.S. Appl. No. 15/207,263.
Notice of Allowance dated Jul. 1, 2020 in U.S. Appl. No. 16/780,717.
Notice of Allowance dated Sep. 24, 2019 in U.S. Appl. No. 16/124,075.
Office Action dated Jan. 16, 2015 in U.S. Appl. No. 13/624,570.
Office Action dated Mar. 19, 2020 in U.S. Appl. No. 16/780,717.
Office Action dated Apr. 5, 2016 in CN Patent Application No. 201380060707.5.
Office Action dated Jul. 1, 2015 in U.S. Appl. No. 13/624,570.
Office Action dated Aug. 9, 2019 in U.S. Appl. No. 16/124,075.
Office Action dated Sep. 18, 2019 in CN Patent Application No. 201710090280.3.
Office Action dated Oct. 3, 2017 in U.S. Appl. No. 15/671,022.
Office Action dated Oct. 21, 2016 in U.S. Appl. No. 15/207,263.
Office Action dated Nov. 4, 2015 in U.S. Appl. No. 13/624,570.
Office Action dated Nov. 28, 2019 in KR Patent Application No. 10-2015-7010302.
Office Action dated Dec. 12, 2017 in U.S. Appl. No. 15/671,022.
Summons to Attend Oral Proceedings dated Sep. 4, 2018 in EP Patent Application No. 1377393.4.
Google Inc., International Preliminary Report on Patentability, PCT/US2013/060991, dated Mar. 24, 2015, 6 pgs.
Google Inc., International Search Report and Written Opinion, PCT/US2013/060991, dated Dec. 6, 2013, 9 pgs.
Google, Certificate of Patent, KR-10-2126987, Jun. 19, 2020, 3 pgs.

* cited by examiner

MEDIA CONTENT MANAGEMENT FOR A FIXED ORIENTATION DISPLAY

PRIORITY CLAIM AND RELATED APPLICATION

This application is a continuation of and claims priority to U.S. patent application Ser. No. 16/780,717, filed Feb. 3, 2020, entitled "Media Content Management for A Fixed Orientation Display," which is a continuation of and claims priority to U.S. patent application Ser. No. 16/124,075, filed Sep. 6, 2018, entitled "Media Content Management for A Fixed Orientation Display," which is a continuation of and claims priority to U.S. patent application Ser. No. 15/671,022, filed Aug. 7, 2017, entitled "Adaptively Displaying Application Output," now U.S. Pat. No. 10,074,157, issued Sep. 11, 2018, which is a continuation of and claims priority to U.S. patent application Ser. No. 15/207,263, filed Jul. 11, 2016, entitled "Displaying Applications on a Fixed Orientation Display," now U.S. Pat. No. 9,767,532, issued Sep. 19, 2017, which is a continuation of and claims priority to U.S. patent application Ser. No. 13/624,570, filed Sep. 21, 2012, entitled "Displaying Applications on a Fixed Orientation Display," now U.S. Pat. No. 9,390,473, issued Jul. 12, 2016. Each of these applications is hereby incorporated by reference in its entirety.

TECHNICAL FIELD

The disclosed implementations relate to the field of applications for electronic devices generally and in particular to displaying applications on electronic devices with fixed orientation displays.

BACKGROUND

Electronic devices, such as personal computers or smart phones, are capable of executing applications. User experience with electronic devices is improved by the use of applications. There are many applications available for electronic devices, including but not limited to calendar applications, voting applications, productivity applications, gaming applications, video display applications, and package tracking applications. Some applications are configured for use on a specific type of electronic device and can only be used on the specific device for which it is configured. Other applications are configured to be used on a wide variety of electronic devices. When configuring an application to be used on an electronic device, it is useful to know the orientation and size of the display associated with the electronic device to ensure that the application is properly displayed to a user of the electronic device.

Some electronic devices, such as smart phones or tablets, have displays that can be easily rotated and used in either a landscape or a portrait orientation. Other electronic devices, such as televisions or personal computers, have displays that are fixed in either landscape orientation or portrait orientation and are not easily rotated to a different orientation. Electronic devices with displays that can be easily rotated are able to correctly display applications configured to be displayed in either a landscape orientation or a portrait orientation because of the ease with which the orientation of the display can be changed.

SUMMARY

In accordance with some implementations, a method displaying the output from an application on a fixed orientation display is disclosed. The method is performed at an application stored on an electronic device having one or more processors, memory storing one or more programs for execution by the one or more processors. The application sends, to the electronic device on which the application is stored, a request to display output from the application in a second orientation with second dimensions. The application receives from the electronic device a notification that a display associated with the electronic device is a fixed orientation display with a first orientation and first dimensions and a notification that the requested second orientation and second dimensions are different from the first orientation. The application then determines optimal dimensions to display the output from the application based on the first orientation and first dimensions associated with the fixed orientation display. The application then scales output data to match the determined optimal dimensions. The application then sends the scaled output data to the electronic device for display on the fixed screen display.

In accordance with some implementations, a method for displaying an application on a fixed orientation display is disclosed. The method is performed on an electronic device, the electronic device having one or more processors, memory storing one or more programs for execution by the one or more processors, and a fixed orientation display with a first orientation. The electronic device receives, from an application running on the electronic device, a request to display the output from the application in a second orientation with second dimensions. The electronic device determines that the display on which output data received from the application is to be displayed is a fixed orientation display with a first orientation that is different from the requested second orientation. The electronic device then receives output from the application for display. The electronic device determines first dimensions of a first display space available to display the output from the application. The electronic device then automatically scales the output received from the application to fit within the first dimensions such that the data outputted by the application is displayed in smaller dimensions than what was originally requested by the application. The electronic device displays the scaled output on the fixed orientation display on the fixed orientation display.

In accordance with some implementations, an electronic device for displaying an application on a fixed orientation display is disclosed. The electronic device has one or more processors, a fixed orientation display with a first orientation, and memory storing one or more applications to be executed by the one or more processors, and a display with a first orientation. An application in the one or more programs includes instructions for sending, to the electronic device on which the application is stored, a request to display output from the application in a second orientation with second dimensions. The application further includes instructions for receiving from the electronic device a notification that a display associated with the electronic device is a fixed orientation display with a first orientation and first dimensions and a notification that the requested second orientation and second dimensions are different from the first orientation. The application further includes instructions for determining optimal dimensions to display the output from the application based on the first orientation and first dimensions associated with the fixed orientation display. The application further includes instructions for scaling output data to match the determined optimal dimensions.

The application further includes instructions for sending the scaled output data to the electronic device for display on the fixed screen display.

In accordance with some implementations, an electronic device for displaying an application on a fixed orientation display is disclosed. The electronic device has one or more processors, a fixed orientation display with a first orientation, and memory storing one or more programs to be executed by the one or more processors. The one or more programs include instructions for receiving, from an application running on the electronic device, a request to display the output from the application in a second orientation with second dimensions. The one or more programs include instructions for determining that the display on which output data received from the application is to be displayed is a fixed orientation display with a first orientation that is different from the requested second orientation. The electronic device further includes instructions for receiving output from the application for display. The electronic device further includes instructions for determining first dimensions of a first display space available to display the output from the application. The electronic device further includes instructions for automatically scaling the output received from the application to fit within the first dimensions such that the data outputted by the application is displayed in smaller dimensions than what was originally requested by the application. The electronic device displays the scaled output received from the application on the fixed orientation display.

In accordance with some implementations, a non-transitory, computer readable storage medium storing one or more applications configured for execution by an electronic device is disclosed. An application in the one or more programs includes instructions for sending, to the electronic device on which the application is stored, a request to display output from the application in a second orientation with second dimensions. The application further includes instructions for receiving from the electronic device a notification that a display associated with the electronic device is a fixed orientation display with a first orientation and first dimensions and a notification that the requested second orientation and second dimensions are different from the first orientation. The application further includes instructions for determining optimal dimensions to display the output from the application based on the first orientation and first dimensions associated with the fixed orientation display. The application further includes instructions for scaling output data to match the determined optimal dimensions. The application further includes instructions for sending the scaled output data to the electronic device for display on the fixed screen display.

In accordance with some implementations, a non-transitory computer readable storage medium storing one or more programs configured for execution by an electronic device is disclosed. The one or more programs include instructions for receiving, from an application running on the electronic device, a request to display the output from the application in a second orientation with second dimensions. The one or more programs include instructions for determining that the display on which output data received from the application is to be displayed is a fixed orientation display with a first orientation that is different from the requested second orientation. The one or more programs further include instructions for receiving output from the application for display. The one or more programs further include instructions for determining first dimensions of a first display space available to display the output from the application. The one or more programs further include instructions for automatically scaling the output received from the application to fit within the first dimensions such that the data outputted by the application is displayed in smaller dimensions than what was originally requested by the application. The one or more programs further include instructions for displaying the scaled output received from the application on the fixed orientation display.

BRIEF DESCRIPTION OF THE DRAWINGS

Like reference numerals refer to corresponding parts throughout the drawings.

DESCRIPTION OF IMPLEMENTATIONS

Figure 1:
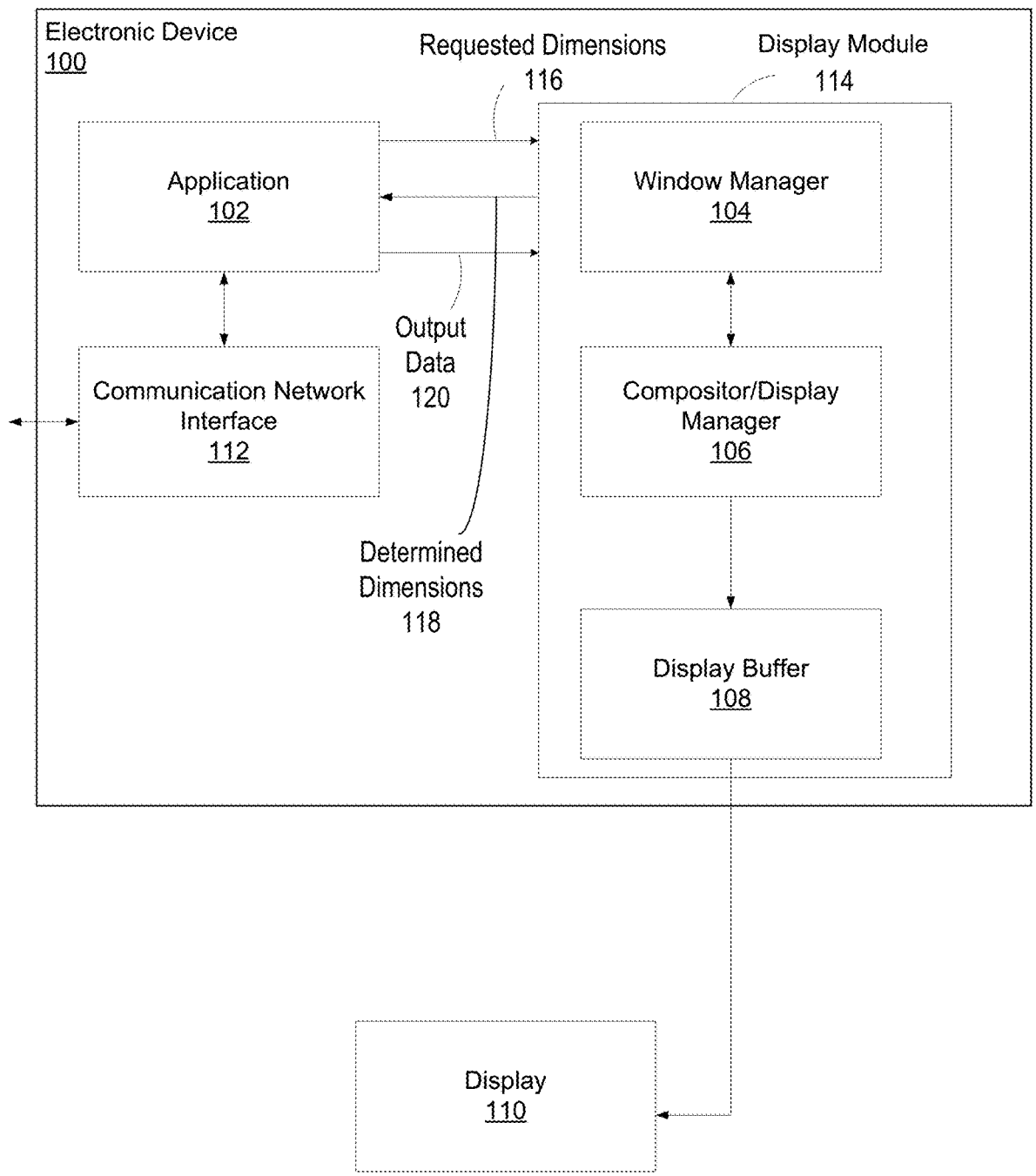
FIG. 1 is a block diagram illustrating an electronic device with a display, in accordance with some implementations.

In some implementations, an electronic device with a display having a fixed orientation and aspect ratio (such as a large, flat panel television with a landscape orientation display and a 16:9 aspect ratio) is configured to execute an operating system (such as the Android® operating system) that can also be executed on other types of devices (e.g., smart phones, tablets, laptop computers, media players, and set top boxes). An advantage of this commonality between operating systems is that the electronic device is able to execute many applications originally configured for use on another type of electronic device. This dramatically increases the scope and number of applications that are available on the electronic device. However, different types of devices often have different display characteristics, which means that the output formats of applications developed for the different device types might not be compatible with the fixed display characteristics (including orientation and aspect ratio) of the electronic device.

In some implementations, the electronic device includes a display module that interacts with applications being executed on the device and/or the display of the electronic device to configure the output of an application for satisfactory display on the electronic device in view of the first device's display characteristics. In some implementations, the display module receives requested dimensions and a requested orientation from an application running on the electronic device. In some implementations, the requested dimensions and the requested orientation match the dimensions and orientation of the fixed orientation display associated with the electronic device. If this is the case, the data outputted by the application for display can be displayed on the fixed orientation display without modification.

In some implementations the requested orientation and dimensions are different from the orientation and dimensions of the fixed orientation display. In this case either the application or the device itself must modify the outputted data to be displayed appropriately on the fixed orientation display associated with the electronic device. The action taken by the electronic device to modify the outputted data will fall into one of four broad categories and will depend on the capabilities of the application. In a first category, the application itself is able to reconfigure the data it outputs for display into the proper dimensions and orientation. In a second category, the application is able to change the dimensions, size, or aspect ratio of the output data but due to limitations of the application (such as the type of content displayed, for example) the application is not able to meet the specific orientation or dimensions of the fixed orientation display. In a third category, the application is able to scale the size (dimensions) of the output, but not able to change the aspect ratio of the output data. In this case, the data is scaled to a smaller version with the aspect ratio intact. Finally, in a fourth category, the application is not able to scale the data it outputs for display at all, and instead the display module of the electronic device automatically scales the output for display on the fixed orientation display without any scaling by the application. These four scenarios will be explained in more detail below.

In some implementations, the requested dimensions will differ from the dimensions of the display and the application is configured to display its output in different orientations (such as an application developed for a smart phone that can display application information in either portrait or landscape modes—typically based on a rotation orientation of the smart phone) and in different dimensions. This situation will fall into the above noted first category. For this type of application, in some implementations the display module interacts with the application to set an appropriate display orientation and aspect ratio for the data outputted by the application to enable at least satisfactory display of the application's output on the electronic device.

For example, presume that the application to be executed on the electronic device is a calendar application designed to display calendar views in either portrait or landscape orientation and in most dimensions. Such an application, in response to receiving notification from the electronic device of the orientation and dimensions of the display, will scale the dimensions and orientation of the information to be displayed such that it matches the appropriate orientation and at the correct dimensions. The data output by the application is then displayed on the fixed orientation device.

In some implementations, the requested dimensions differ from the dimensions of the display and the application is configured with the capability to change the size and aspect ratio but not to alter the orientation of the display data. This situation will fall into the above noted second category. When this is the case, the application will determine the output dimensions of the information such that all application information is displayed, but on only a portion of the display. For example, if an application is configured to display information in landscape orientation and with a 16:9 aspect ratio, and the fixed orientation display has a portrait orientation with a 9:16 aspect ratio, maintaining the 16:9 aspect ratio of the application display window will result in about 30% of the display being used to display the output of the application (due to the fact that information from the application will be displayed in a letter box format on the fixed display in order for the application aspect ratio to be retained when displayed).

In some implementations, in order to use more screen real estate of the display, the application will modify the aspect ratio of the displayed information to a 4:3 aspect ratio instead of the original 16:9 aspect ratio. This situation will fall into the above noted third category. This will have the effect of using more than 40% of the screen real estate of the display for presentation of the application information. Thus, in accordance with some implementations, the electronic device determines dimensions with an aspect ratio which differs from the aspect ratio associated with the requested orientation and dimensions so as to use as much of the fixed orientation display as possible. For an illustration of how this scaling may be accomplished see FIG. 3B and the accompanying discussion below. The electronic device then receives the scaled output from the application. The received output is then displayed on the fixed orientation display In some implementations, the requested dimensions differ from the dimensions of the display and the application is configured with the capability to change the size (scale) of the display data, but not the aspect ratio or orientation of the output display data. When this is the case, the display module determines dimensions describing the maximum screen space available to the application, given the aspect ratio of the output, and sends the determined dimensions to the application. The application then scales the display data down to the dimensions received from the display module. The display data will have smaller dimensions than the originally requested dimension but the same aspect ratio. For an illustration of how this scaling may be accomplished see FIG. 3A and the accompanying discussion below. The scaled output data is then displayed on the fixed orientation display.

In accordance with some implementations, the requested dimensions differ from the dimensions of the display and the application is not configured with the capability to scale the display data it outputs to an orientation and dimensions different from the orientation and dimensions requested by the application. This situation will fall into the above noted forth category. For example, a digital video viewing application or video game application may be designed to run only in a specific orientation and with specific dimensions. Thus, in some implementations, the output data the electronic device receives from the application is in the requested second orientation and second dimensions and has not been scaled to fit within the first dimensions of the fixed orientation display.

When this is the case, the display module of the electronic device is configured to automatically scale the output data received from the application to fit within the dimensions of the display. The scaled output data will be displayed in smaller dimensions than what was originally requested by the application. For example, if a game application that was configured to be displayed on a smart phone in portrait orientation was run on a personal computer with a display that was fixed in the landscape orientation, the game application itself would not scale the visual data output it was sending to the electronic device. Instead, the electronic device would determine dimensions available to display the application in the requested orientation. In some implementations, the dimensions are determined so as to use as large a portion of the display as possible, while still displaying the application in the requested second orientation. For an illustration of how this scaling is to be done see FIG. 3A and the accompanying discussion below. Once the new dimensions have been determined, the output data from the application is then automatically scaled to the determined dimensions and displayed on the fixed orientation display.

In some implementations, the dimensions needed are determined only once, when the application first requests a display orientation and dimensions. The determined dimensions can then be used to automatically scale the output from the application until the application requests new dimensions or ceases outputting data for display. The electronic device then displays the scaled output on the fixed orientation display.

FIG. 1 is a block diagram illustrating an electronic device with a fixed orientation display, in accordance with some implementations. The electronic device 100 includes one or more applications 102, a display module 114, which includes a window manager 104, a compositor/display manager 106, and a display buffer 108, a display 110, and optionally, a communication network interface 112. The communication network interface 112 may connect to any of a variety of networks, including local area networks (LAN), wide area networks (WAN), wireless networks, wired networks, the Internet, or a combination of such networks.

In accordance with some implementations, the one or more applications 102 can be any type of application capable of running on an electronic device. For example, the one or more applications 102 can include game applications, video display applications, word processing application, productivity applications, email applications, internet browsing applications, and many others. In some implementations, the one or more applications 102 are specifically configured to be run on a specific electronic device with a particular orientation and particular dimensions.

In some implementations, the one or more applications 102 were designed to be run on a wide variety of electronic devices. In some implementations, the one or more applications 102 were written for a multi-device platform. For example, the Android® operating system is used on a wide variety of electronic devices, including smart phones and tablets, and therefore applications configured for the Android® operating system will available to be used on the same wide variety of devices. In some cases a platform is extended to a new type of electronic device. As such, applications that were configured to be shown on a specific display orientation, dimensions, or size, may later need to run on a display for which was not originally configured.

In some implementations the display module 114 receives information from the one or more applications 102 and passes it onto the windows manager 104. Such information includes, but is not limited to, requests from the one or more applications 102 to display outputted data in a requested orientation with requested dimensions 116 and the output display data 118 generated by the one or more applications 102. In some implementations, the windows manager 104 determines whether the electronic device has an associated display 110 which is capable of displaying the output from the one or more applications 102 in the requested orientation and dimensions 116.

In accordance with a determination that that the electronic device does not have an associated display 110 which is able to display in the requested orientation and dimensions 116, the windows manager 104 then determines whether the application 102 is able to scale the outputted data to the dimensions and orientation of the fixed orientation display. In some implementations, this determination is made based on metadata concerning the application which is stored on the electronic device, retrieved from a remote database over the communication network interface 112, or from the application 102 itself. In accordance with a determination that the application 102 is able to scale the outputted data to the dimensions and orientation of the fixed orientation display, the windows 104 manager sends the application 102, the orientation and dimensions 118 of the fixed orientation display 110. The application 102 then scales the outputted data 120 to the received orientation and dimensions before outputting the display data 120 to the windows manager 104.

In some implementations, in accordance with a determination that the application 102 does not have the ability to scale has a fixed orientation display 110 which is in a different orientation from the requested orientation 116, the windows manager 104 determines the largest area possible to display the outputted display data 120 from the application 104. The dimensions determined by the windows manager 104 and display data outputted 120 by the application 102, are transmitted to the compositor/display manager 106.

In accordance with some implementations, the compositor/display manager 106 composes the final version of the data to be displayed on the fixed orientation display 110. The compositor/display manager 106 receives display information from the window manager 104 from one or more applications 102 and arranges all the received data into a final display arrangement. In some implementations, the information received from the window manager 104 is ready to be outputted for display on the fixed orientation display 110 without modification. In some implementations, the display manager 106 receives determined dimensions along with display data outputted by the one or more applications 102. The compositor/display manager 106 uses the determined dimensions to automatically scale the received information from its original dimensions to the determined dimensions for display.

In some implementations, the compositor/display manager 106 then centers the newly scaled information on the fixed orientation display. In some implementations, the compositor/display manager 106 fills the parts of the display not displaying the display data outputted by the application 102 with a standard color, such as black. This results in a "letter-boxing" or "pillar-boxing" effect with the uniform color displayed in all areas of the display 110 not currently displaying the scaled output display information from the application 102. In some implementations, the compositor/display manager 106 receives output data 120 from more than one application 102 and arranges the multiple applications on the display 110 in accordance with default rules or the preferences of a user of the electronic device 100. Once the compositor/display manager 106 has composed all data received from the window manager 104 the resulting display data is sent to the display buffer 108.

In accordance with some implementations, the display buffer 108 includes output data for each pixel of the display 110, such that display data received from the compositor/display manager 106 is stored in the display buffer 108 for each pixel of the display 110. In some implementations, the fixed orientation display 110 periodically reads the values stored in the display buffer 108 and updates the display 110 based on the stored values. The rate at which the display 110 reads the values stored in the display buffer 108 determines the refresh rate of the display 110.

Figure 2:
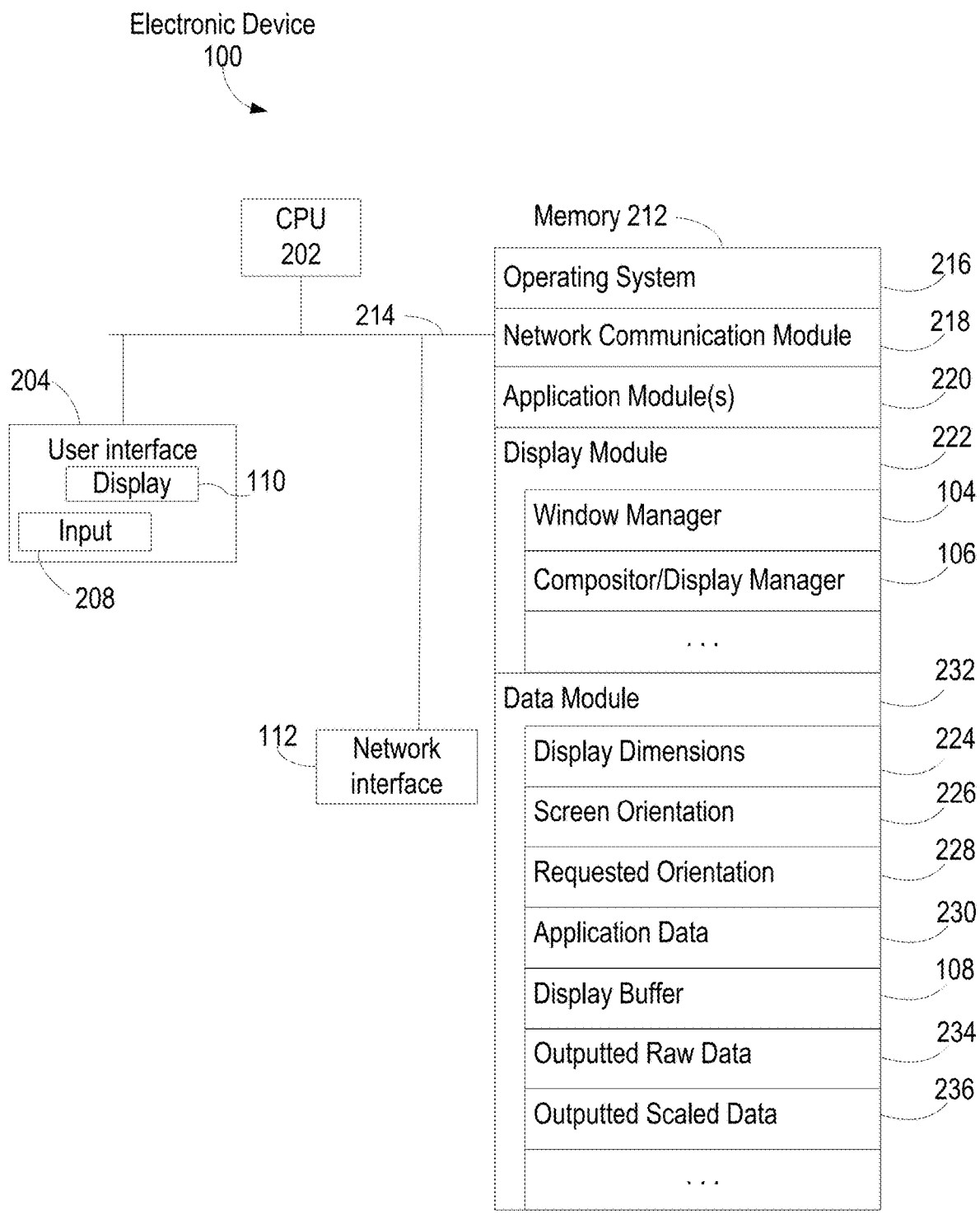
FIG. 2 is a block diagram illustrating an electronic device, in accordance with some implementations.

FIG. 2 is a block diagram illustrating an electronic device, in accordance with some implementations. The electronic device 100 typically includes one or more processing units (CPU's) 202, one or more network interfaces 112, memory 212, and one or more communication buses 214 for interconnecting these components. The electronic device includes a user interface 204. The user interface 204 includes a display device 110 and optionally includes an input means such as a keyboard, mouse, a touch sensitive display, or other input buttons 208. Optionally, the display device 110 includes an audio device or other information delivery device. Furthermore, some electronic devices use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

an operating system 216 that includes procedures for handling various basic system services and for performing hardware dependent tasks;

a network communication module 218 that is used for connecting the client system 102 to other computers via the one or more communication network interfaces 112 (wired or wireless) and one or more communication networks, such as the Internet, other wide area networks, local area networks, metropolitan area networks, and so on;

an application module 220 that includes one or more applications (FIG. 1, 102) configured to run on the electronic device, including a variety of possible applications such as: browser applications, productivity applications, game applications, word processing applications, calendar applications, video display applications etc.;

a display module 222 for enabling the information outputted by the one or more applications (FIG. 1, 102) to be displayed on the fixed orientation display (FIG. 1, 110), including but not limited to:
- a window manager module 104 for receiving requests from the one or more applications (FIG. 1, 102), determining display space dimensions available to the one or more applications (FIG. 1, 102), sending the determined display space dimensions to the one or more applications (FIG. 1, 102), and sending the display data outputted by the one or more applications (FIG. 1, 102) to the compositor/display manager 106; and
- a compositor/display manager 106 for receiving display data from the window manager 104, arranging the objects which need to be displayed on the display into a single composed display, and automatically scaling output from one or more applications (FIG. 102) to a size that can be displayed on the fixed orientation display (FIG. 1, 110), centering output from one or more applications (FIG. 102) in the center of the fixed orientation display; and filling the parts of the fixed orientation display (FIG. 1, 110) not displaying the output of the one or more applications (FIG. 1, 102) with black; and a data module 232 for storing data related to the electronic device 100 or one or applications (FIG. 1, 102), including but not limited to:

display dimensions data 224 including data concerning the dimensions of the fixed orientation display (FIG. 1, 110) associated with the electronic device 100, including at least in some cases the physical size of the display, the height and width of the display in pixels (1920×1080 pixels, for example), and the density of the pixels on the display (measured in dots per inch (DPI), pixels per inch (PPI), or some other pixel density measuring units);

display orientation data 226 including the orientation of the fixed orientation display (FIG. 1, 110), which, in some implementations, can be determined based on the display dimensions data;

requested orientation data 228 including data representing the orientation requested by the one or more applications (FIG. 1, 102) to display the output from the one or more applications (FIG. 1, 102);

application data 230 including data associated with the one or more applications (FIG. 1, 102) stored in the application module 220, the stored data including but not limited to: the type of application, whether the application is able to scale the output produced to be displayed in an orientation and dimensions different from the requested orientation and dimensions, and any data needed by the one or more applications (FIG. 1, 102) to run on the electronic device 100; and display buffer 108 includes data representing the values to be output to the fixed orientation display (FIG. 1, 110) on a per pixel basis;

outputted raw data 234 includes data received by the windows manager 104 from the one or more applications 102 that has not been scaled to fit determined dimensions or a determined orientation for display in the fixed orientation display 110; and outputted scaled data includes data received by the windows manager 104 from the one or more applications (FIG. 1, 102) or the produced by the compositor/display manager (FIG. 1, 106) which has been scaled to fit determined dimensions and orientation by either the one or more applications (FIG. 1, 102) themselves or scaled automatically by the compositor/display manager (FIG. 1, 106).

Figure 3A:
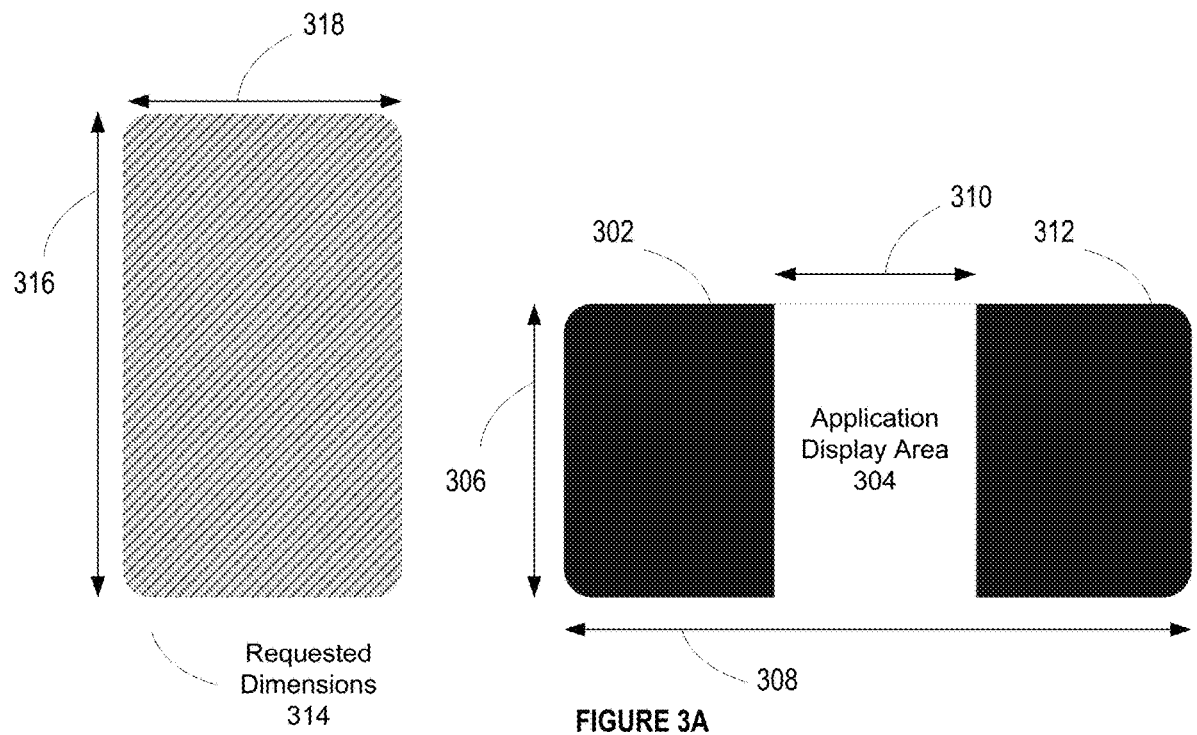
FIG. 3A depicts an application as displayed on a fixed orientation display in accordance with some implementations.

FIG. 3A depicts an application as displayed on a fixed orientation display in accordance with some implementations. In this example, a fixed orientation display 302 displays the output data from an application (FIG. 1, 102) in an application display area 304. The fixed orientation display 302 has a height dimension 306 and a width dimension 308. The application display area 304 has a height dimension 306 and an application width dimension 310. The electronic device (FIG. 1, 100) receives requested dimensions 314 from the application (FIG. 1, 102). The requested dimensions 314 have a requested height dimension 316 and a requested width dimension 318. However, because the orientation of the requested dimensions 314 (as evidenced by the requested height dimension 316 and the requested width dimension 318) is different from the orientation of the fixed orientation display 302, the output from the application (FIG. 1, 102) must be scaled to be displayed on the fixed orientation display 302. For example, if the requested dimensions are 1920 pixels for the requested height dimension 316 and 1080 pixels for the requested width dimension 318 and the dimensions of the fixed orientation are a height dimension 306 of 1080 and a width dimension of 1920, the fixed orientation would be unable to display the output data from the application (FIG. 1, 102) as requested. The outputted display data is scaled to be displayed on the fixed orientation display 302 by either the application (FIG. 1, 102) itself or automatically by the compositor/display manager (FIG. 1, 106).

In some implementations the output is scaled without altering the aspect ratio associated with the outputted data. In the current example then, the ratio of the requested dimensions is: height dimension 316 (1920) to the width dimension 318 (1080), which is more commonly denoted as 9:16. To maintain the same aspect ratio, new height and width dimensions must be determined. Since the height dimension 306 of the fixed orientation display 302 is the limiting factor, the new scaled height dimension of the output data from the application (FIG. 1, 102) is set to its maximum value (1080 pixels), which is the same as the height dimension 306 of the fixed orientation display 302. The corresponding width dimension 308 would be 607.5 pixels (rounded up or down). Thus, the application output data is displayed in the application display area with a resolution of 1080×607.5. The parts of the fixed orientation display 302 which are outside of the application display area are called excess screen space 312 and are blacked out, creating a "pillar box" effect.

Figure 3B:
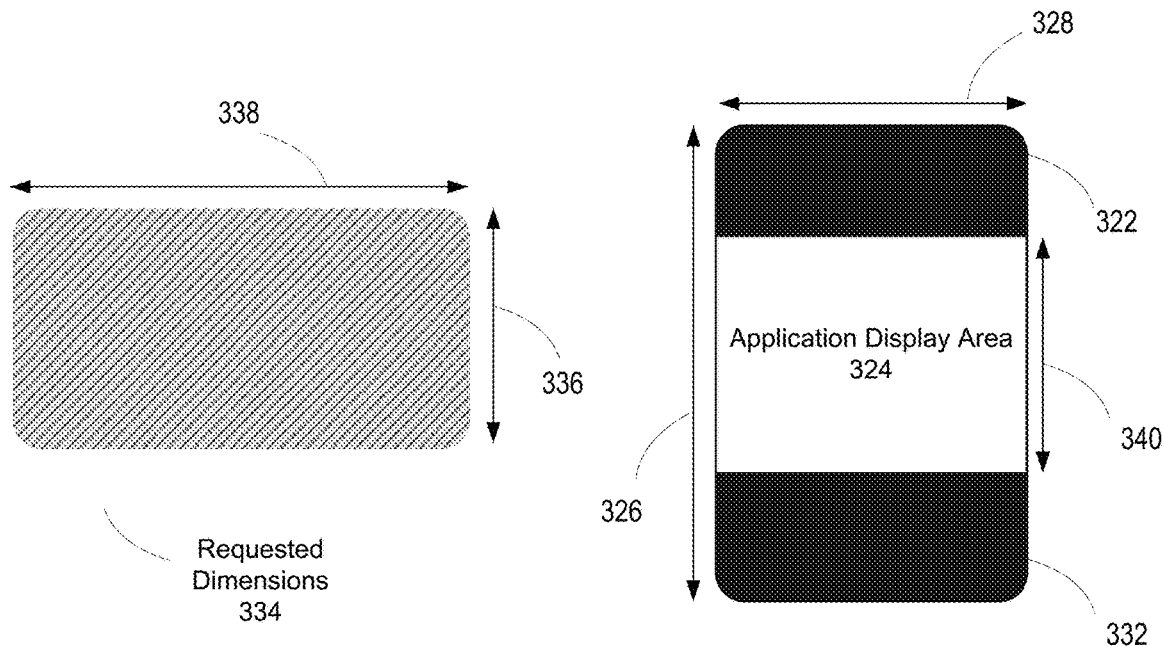
FIG. 3B depicts an application as displayed on a fixed orientation display in accordance with some implementations.

FIG. 3B depicts a user interface on a fixed orientation display in accordance with some implementations. In this example, a fixed orientation display 322 displays the display output from an application (FIG. 1, 102) in an application display area 324. The fixed orientation display 322 has a height dimension 326 and a width dimension 328. The application display area 324 has an application height dimension 340 and a width dimension 328. The application (FIG. 1, 102) sent requested dimensions 334 to the electronic device (FIG. 1. 100). The requested dimensions 334 have a requested height dimension 336 and a requested width dimension 338. However, because the orientation of the requested dimensions 334 (as evidenced by the requested height dimension 336 and the requested width dimension 338) is different from the orientation of the fixed orientation display 322, the output from the application (FIG. 1, 102) must be scaled to be displayed on the fixed orientation display 322. For example, if the requested dimensions are 1080 pixels for the requested height dimension 316 and 1920 pixels for the requested width dimension 318 and the dimensions of the fixed orientation are a height dimension 326 of 1920 pixels and a width dimension 328 of 1080 pixels, the fixed orientation would be unable to display the output data from the application (FIG. 1, 102) as requested. Instead, the outputted display data must be scaled to be displayed on the fixed orientation display 322 by either the application (FIG. 1, 102) itself or automatically by the compositor (FIG. 1, 106)

In some implementations, the output is scaled with a different aspect ratio than the aspect ratio associated with the requested dimensions so as to use a larger percentage of the fixed orientation display than would be possible if the aspect ratio were maintained. For example if the requested dimensions 334 were 1920×1080 (with a width dimension 338 of 1920 and a height dimension 336 of 1080) and a fixed orientation display with dimensions 1080×920 (with a width dimension 328 of 1080 and a height dimension 306 of 1920) the resulting scaled image would be 1080×607.5. This scaled version would only occupy about 30 percent of the total available display space. However, if the aspect ratio was changed to 4:3, the resulting dimensions of the application display area 324 would be 1080×810, which uses over 40 percent of available display space. Thus, in accordance with some implementations, the windows manager (FIG. 1, 104) may determine display dimensions for the application output which have a different aspect ratio than the requested dimensions 334 in order to increase the percentage of the display (FIG. 1, 110) which is used to display the application (FIG. 1, 102) output.

Figure 4:
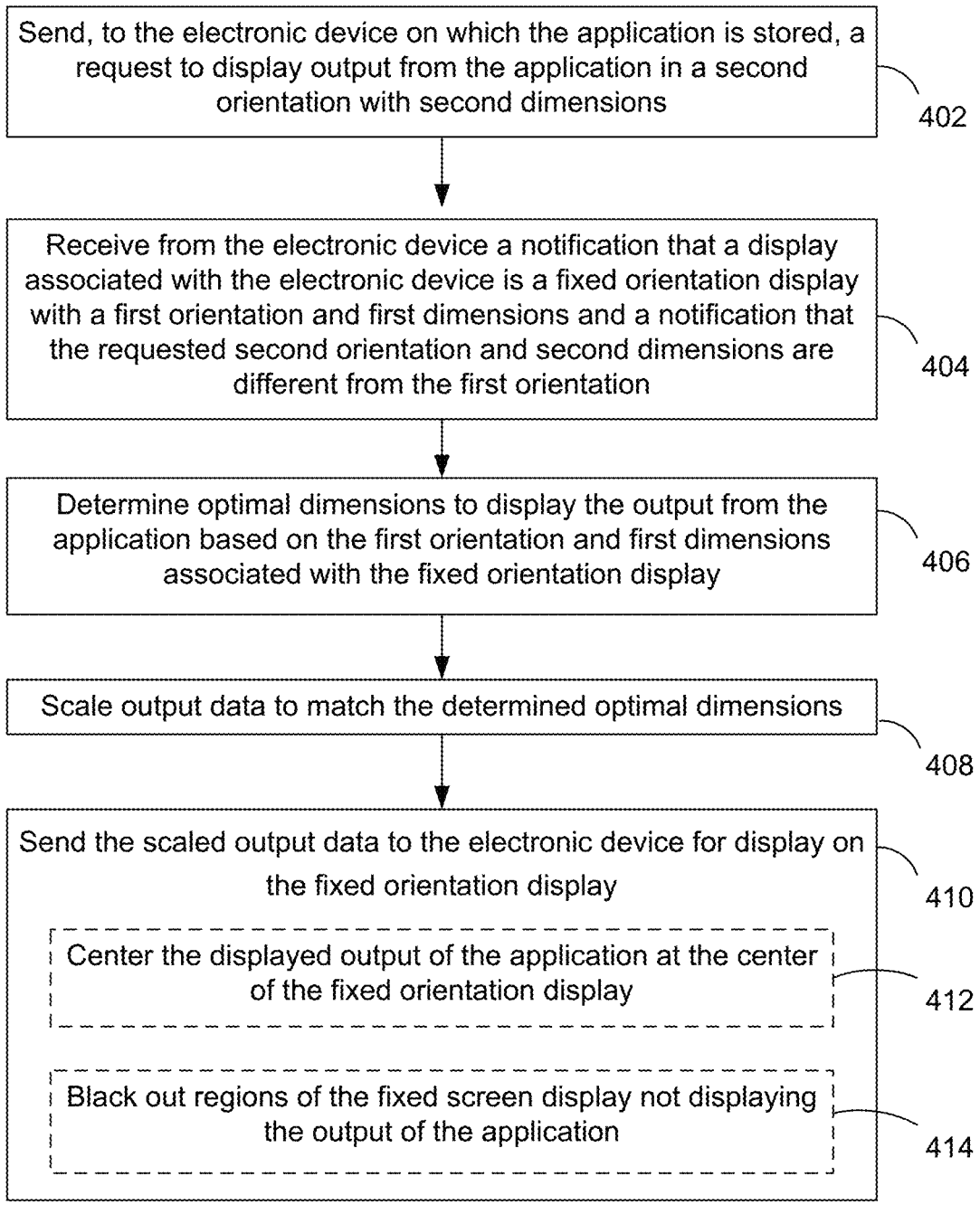
FIG. 4 is a flow diagram illustrating the process of receiving a request from an application, responding by sending the dimensions of the fixed orientation display, and displaying the output of the application scaled to fit the dimensions of the fixed orientation display in accordance with some implementations.

FIG. 4 is a flow diagram illustrating the process of displaying the output of an application (FIG. 1, 102) on a fixed orientation display, in accordance with some implementations. Each of the operations shown in FIG. 4 may correspond to instructions stored in a computer memory or computer readable storage medium. Optional operations are indicated by dashed lines (e.g., boxes with dashed-line borders). In some implementations, the method described in FIG. 4 is performed by the electronic device (FIG. 1, 100).

In accordance with some implementations, an application (FIG. 1, 102) sends, to the electronic device (FIG. 1, 100) on which the application is stored, a request to display output from the application in a second orientation with second dimensions (402). In some implementations, the application (FIG. 1, 102) receives from the electronic device (FIG. 1, 100) a notification that a display (FIG. 1, 110) associated with the electronic device (FIG. 1, 100) is a fixed orientation display (FIG. 1, 110) with a first orientation and first dimensions and a notification that the requested second orientation and second dimensions are different from the first orientations (404). For example if the requested dimensions are 1920×1080, the application (FIG. 1, 102) receives a notification that the requested orientation is landscape orientation.

In accordance with some implementations, the application (FIG. 1, 102) determines (FIG. 1, 102) optimal dimensions to display the output from the application based on the first orientation and first dimensions associated with the fixed orientation display (406). For example, if the requested second dimensions are 1920×1080 and the second orientation is determined to be landscape orientation, and the first orientation has a portrait orientation, the application (FIG. 1, 102) determines, based on the first and second dimensions, optimal dimensions for displaying the application output on the fixed orientation display (FIG. 1, 110). In accordance with some implementations, the application (FIG. 1, 102) scales output data to match the determined optimal dimensions (408).

In accordance with some implementations, the application (FIG. 1, 102) then sends the scaled output data to the electronic device for display on the fixed orientation display (FIG. 1, 110) (410).

In accordance with some implementations, sending the scaled output includes sending instructions for displaying the output of the application on the fixed orientation display (FIG. 1, 110) includes centering the displayed output of the application at the center of the fixed orientation display (412). In accordance with some implementations, sending the scaled output includes sending instructions for displaying the output of the application on the fixed orientation display (FIG. 1, 110) includes blacking out the regions of the fixed orientation display (FIG. 1, 110) not displaying the output of the application (414).

In some implementations, the output of the application (FIG. 1, 102) is scaled to an aspect ratio which is different from the aspect ratio of the requested dimensions, but does not necessarily maximize the screen usage. For example, the application may change to an aspect ratio which is well known or commonly used for a specific type of application. By displaying an application in a familiar aspect ratio, user experience can be improved even though the application is not displayed in the most preferred orientation and aspect ratio. This is especially true if the fixed orientation display (FIG. 1, 110) has a not standard orientation. For example, if the electronic device has a nearly square display, it may be preferable to display the output from an application (FIG. 1, 102) with an aspect-ratio like a portrait phone. In some implementation a border would be added to further create the look and feel of a standard display ratio.

Figure 5:
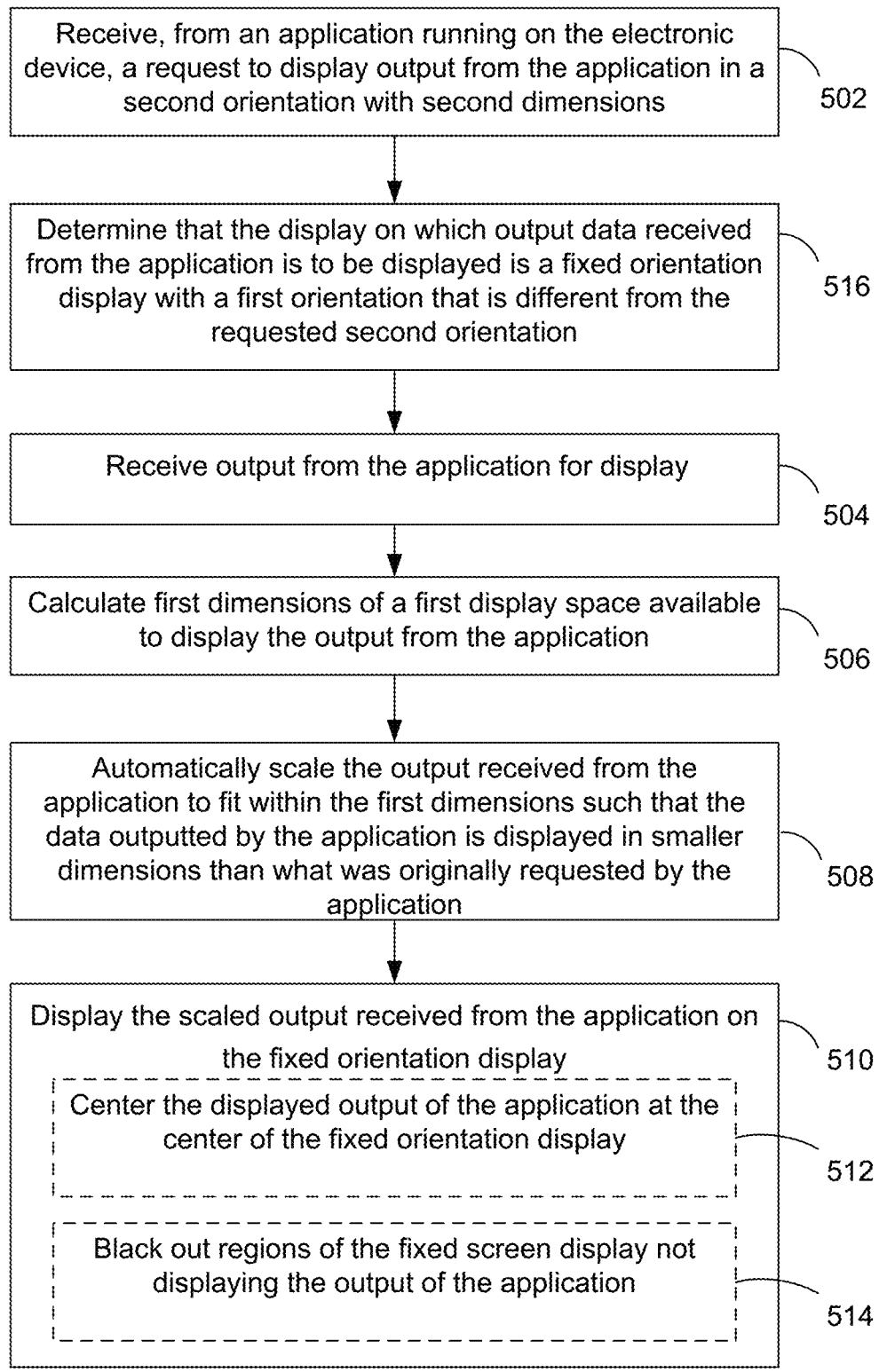
FIG. 5 is a flow diagram illustrating the process of receiving a request from an application, automatically scaling the output received from the application, and displaying the output of the application scaled to fit the dimensions of the fixed orientation display in accordance with some implementations.

FIG. 5 is a flow diagram illustrating the process of displaying an application's (FIG. 1, 102) output on a fixed orientation display, in accordance with some implementations. Each of the operations shown in FIG. 5 may correspond to instructions stored in a computer memory or computer readable storage medium. Optional operations are indicated by dashed lines (e.g., boxes with dashed-line borders). In some implementations, the method described in FIG. 5 is performed by the electronic device (FIG. 1, 100).

In accordance with some implementations, the electronic device (FIG. 1, 100) receives, from an application (FIG. 1, 102) running on the electronic device (FIG. 1, 100), a request to display output from the application (FIG. 1, 102) in a second orientation with second dimensions (502). The electronic device (FIG. 1, 100) determines that the display on which output data received from the application is to be displayed is fixed orientation display with a first orientation that is different from the requested second orientation (516). The electronic device (FIG. 1, 100) receives output from the application (FIG. 1, 102) for display (504). The electronic device determines first dimensions of a first display space available to display the output from the application (506). This determination is made by accessing display dimensions data (FIG. 2, 224) to get the first dimensions which correspond to the dimensions of the fixed orientation display (FIG. 1, 110) and comparing the first dimensions against the requested second dimensions.

In accordance with some implementations, the determined first dimensions have the same aspect ratio as the requested second dimensions received from the application (FIG. 1, 102). In accordance with other implementations, the determined first dimensions have a different aspect ratio than the requested second dimensions received from the application (FIG. 1, 102), wherein the determined first dimensions are determined to increase the percentage of the fixed orientation display (FIG. 1, 110) which is used to display the output received from the application (FIG. 1, 102).

In accordance with some implementations, the electronic device (FIG. 1, 100) automatically scales the output received from the application (FIG. 1, 102) to fit within the first dimensions such that the data outputted by the application is displayed in a smaller display space than what was originally requested by the application (508).

The electronic device (FIG. 1, 100) displays the scaled output on the fixed orientation display (FIG. 1. 110) (510). In accordance with some implementations, displaying the output of the application (FIG. 1, 102) on the fixed orientation display (FIG. 1, 110) includes centering the displayed output of the application (FIG. 1, 102) at the center of the fixed orientation display (512). In accordance with some implementations, displaying the output of the application (FIG. 1, 102) on the fixed orientation display (FIG. 1, 110) includes blacking out the regions of the fixed orientation display not displaying the output of the application (514).

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method of displaying content of an application on a target display device having first dimensions, comprising:
    at an electronic device including a display module for enabling display on the target display device that is external to the electronic device:
        receiving a request to display the content of the application, the content having second dimensions distinct from the first dimensions;
        determining whether the application is able to scale the output from the application in accordance with the first dimensions of the target display device that is external to the electronic device;
        in response to determining that the application is able to scale the output from the application in accordance with the first dimensions of the target display device, determining one or more adjustments to the second dimensions to scale the content of the application to the first dimensions of the target display device that is external to the electronic device; and
        causing the display module to scale the content of the application according to the one or more adjustments, thereby enabling the content to be displayed on the target display device that is external to the electronic device.

2. The method of claim 1, wherein the target display device has a fixed orientation, and the content of the application is configured to be displayed according to a second orientation.

3. The method of claim 1, further comprising:
determining whether the application is able to adjust, in part, the content from the second dimensions to the first dimensions of the target display device; and
in accordance with a determination that the application is able to adjust, in part, the content from the second dimensions to the first dimensions of the target display device, determining, in part, the one or more adjustments to the second dimensions by the application.

4. The method of claim 1, wherein the application is one of a plurality of applications that are installed on the electronic device to run thereon, and the application is configured to provide the content in either one of a portrait orientation and a landscape orientation.

5. The method of claim 1, wherein determining the one or more adjustments to the second dimensions to scale the content of the application to the first dimensions of the target display device includes determining optimal dimensions for scaling the content of the application of the electronic device for display on the target display device.

6. The method of claim 5, wherein an optimal aspect ratio of the determined optimal dimensions is different than a second aspect ratio of the second dimensions, such that displaying the content of the application with the optimal aspect ratio uses a larger percentage of the target display device than is used when displaying the content with the second aspect ratio.

7. The method of claim 5, wherein an optimal aspect ratio of the determined optimal dimensions is the same as a second aspect ratio corresponding to the second dimensions of the content of the application.

8. The method of claim 1, further comprising:
obtaining metadata concerning the content of the application by the display module, wherein the display module is configured to determine whether the application is able to scale the content based on the metadata concerning the application.

9. The method of claim 8, wherein the metadata is stored on the electronic device, retrieved from a remote database over a communication network interface, or provided by the application.

10. The method of claim 1, further comprising:
enabling display of the content of the application on the target display device, including centering the displayed content of the application at the center of the target display device.

11. An electronic device, for displaying output of a user application on a target display device having first dimensions, comprising:
one or more processors; and
memory storing one or more programs to be executed by the one or more processors, wherein the memory is configured to store a display module for enabling display on the target display device that is external to the electronic device, the one or more programs comprising instructions for:
receiving a request to display the content of the application, the content having second dimensions distinct from the first dimensions;
determining whether the application is able to scale the output from the application in accordance with the first dimensions of the target display device that is external to the electronic device;
in response to determining that the application is able to scale the output from the application in accordance with the first dimensions of the target display device, determining one or more adjustments to the second dimensions to scale the content of the application to the first dimensions of the target display device that is external to the electronic device; and
causing the display module to scale the content of the application according to the one or more adjustments, thereby enabling the content to be displayed on the target display device that is external to the electronic device.

12. The electronic device of claim 11, wherein the one or more programs further comprise instructions for:
determining whether the application is able to adjust, in part, the content from the second dimensions to the first dimensions of the target display device; and
in accordance with a determination that the application is able to adjust, in part, the content from the second dimensions to the first dimensions of the target display device, determining, in part, the one or more adjustments to the second dimensions by the application.

13. The electronic device of claim 11, wherein a first orientation of the target display device is distinct from a second orientation associated with the content of the application, and the one or more programs further comprise instructions for:
displaying the content of the application with the second orientation and an aspect ratio corresponding to the second dimensions associated with the application.

14. The electronic device of claim 11, wherein the one or more programs further comprise instructions for:
displaying the content of the application with a second orientation and with an aspect ratio that is distinct from a first aspect ratio of the target display device and a second aspect ratio associated with the application.

15. The electronic device of claim 11, wherein the one or more programs further comprise instructions for:
enabling display of the content of the application on the target display device, including blacking out regions of the target display device not displaying the content of the application.

16. A non-transitory computer readable storage medium storing one or more programs configured for execution by an electronic device with a target display device having first dimensions, the one or more programs comprising instructions for:
at the electronic device, wherein the electronic device includes a display module for enabling display on the target display device that is external to the electronic device:
receiving a request to display the content of the application, the content having second dimensions distinct from the first dimensions;
determining whether the application is able to scale the output from the application in accordance with the first dimensions of the target display device that is external to the electronic device;
in response to determining that the application is able to scale the output from the application in accordance with the first dimensions of the target display device, determining one or more adjustments to the second dimensions to scale the content of the application to the first dimensions of the target display device that is external to the electronic device; and
causing the display module to scale the content of the application according to the one or more adjustments, thereby enabling the content to be displayed on the target display device that is external to the electronic device.

17. The non-transitory computer readable storage medium of claim 16, wherein the one or more programs further comprise instructions for:
- determining whether the application is able to adjust, in part, the content from the second dimensions to the first dimensions of the target display device; and
- in accordance with a determination that the application is able to adjust, in part, the content from the second dimensions to the first dimensions of the target display device, determining, in part, the one or more adjustments to the second dimensions by the application.

18. The non-transitory computer readable storage medium of claim 16, wherein the application is configured to generate the request, and the display module is configured to determine whether the application is able to scale the content of the application.

19. The non-transitory computer readable storage medium of claim 16, wherein the one or more programs further comprise instructions for:
- determining a standard aspect ratio designated for a type of the application.

20. The non-transitory computer readable storage medium of claim 16, wherein the one or more programs further comprise instructions for:
- displaying the content of the application with an optimal aspect ratio that is configured to use a larger percentage of the target display device than those used when the content is displayed with a first aspect ratio of the target display device or a second aspect ratio associated the application.

* * * * *